May 21, 1968 D. B. CARSON 3,383,838
HYDROGEN PURIFICATION PROCESS
Filed June 29, 1966
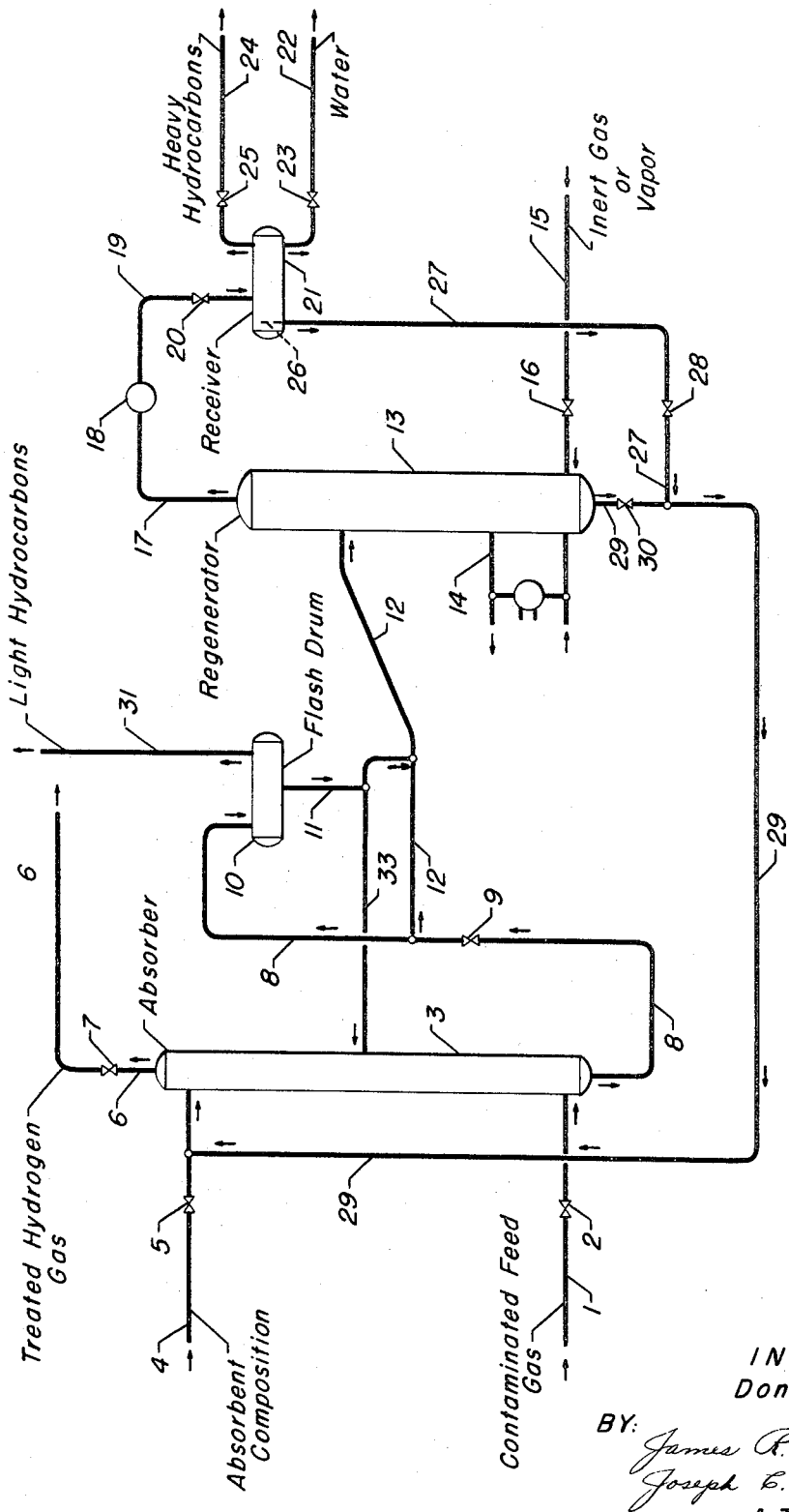
INVENTOR:
Don B. Carson
BY: James R. Hoatson Jr.
Joseph C. Mason Jr.
ATTORNEYS

# United States Patent Office 3,383,838
Patented May 21, 1968

3,383,838
HYDROGEN PURIFICATION PROCESS
Don B. Carson, Mount Prospect, Ill., assignor to Universal Oil Products Company, Des Plaines, Ill., a corporation of Delaware
Filed June 29, 1966, Ser. No. 561,576
12 Claims. (Cl. 55—44)

ABSTRACT OF THE DISCLOSURE

A method for concentrating hydrogen by contacting a gaseous charge mixture containing hydrogen, hydrocarbons, and acid gases with an absorption medium composition comprising polyglycol ethers, organic amine, and hydrocarbon at least partially soluble in the ether, under absorption conditions comprising a temperature in the range of 50° F. to 300° F. and a high pressure in the range of 100 p.s.i.g. to 3000 p.s.i.g. The rich absorbent passes to a flash separator maintained at medium pressure wherein a part of the absorbed non-hydrogen components are flashed off and the resulting partially-regenerated absorbent is recycled in part to the absorption zone while a second part is sent to a stripping zone for substantially complete regeneration of the absorption medium at a low pressure before return to the absorption zone.

This invention relates to the separation of gases. It particularly relates to a method for recovering a concentrated stream of hydrogen from a gaseous mixture. It especially relates to an absorption method for separating hydrogen from methane and other paraffinic hydrocarbons.

In certain chemical processes, such as those relating to the catalytic conversion of hydrocarbons, it is a practical necessity to recycle large quantities of a gaseous reactant such as hydrogen in order to maintain the proper ratio of reactants in the presence of the catalyst, to prolong catalyst life, and to insure that the rate of conversion is maintained at a high level. However, it is a natural by-product from catalytic conversion processes to have the gaseous reactant which is to be recycled contaminated with other closely boiling hydrocarbons which had been produced by the catalytic reaction. Therefore, it becomes incumbent to purify the gaseous reactant in some way in order to reduce the contaminant level to a point where the reactant can be recycled.

The problem of contaminating hydrogen-containing gas streams can be specifically illustrated with reference to the petroleum refining industry. In conventional refinery practice various processes commonly employed in refining petroleum products and in producing petroleum products of enhanced economic value, yield by-product gases containing hydrogen in admixture with methane and other light hydrocarbons such as ethylene, ethane, propylene, propane, butenes, butanes, etc. Examples of such refinery processes include thermal cracking, catalytic cracking, catalytic reforming, various combinations of these processes, and the like. The problem of hydrogen purification has also recently been exemplified in the new catalytic cracking processes using hydrogen (commonly called hydrocracking), which upgrade lower valued products, such as gas oils and residuums, to gasoline grade products. The effluent hydrogen gas from a process such as hydrocracking may also be contaminated with light paraffinic hydrocarbons plus acidic gases such as hydrogen sulfide which make it desirable to purify the recycle hydrogen stream before its use in the process. If proper purification is not accomplished, the molar ratio of the hydrogen becomes too low for the maintenance of high conversion levels and/or catalyst deactivation rates sharply increase thereby rendering the process economically unattractive.

The prior art procedures for separating components of refinery gases and for the purification of hydrogen-containing streams usually involve the use of an absorption step in which heavier or undesirable components are to an extent selectively absorbed from the lighter components by means of an absorption medium, such as light kerosene, followed by various stripping and reactivating steps for separating the absorbent components from each other and from the absorbing medium. With particular reference to the purification of hydrogen, these prior art processes involve the selective absorption of the hydrocarbon components into an absorber oil such as kerosene, separating a hydrogen-rich stream from the absorption zone and then regenerating the absorber oil through a relatively high temperature stripping process for the removal of the absorbed hydrocarbon components from the absorber oil. In virtually every prior art situation usually the absorber oil was not selective for any acid gases present, such as hydrogen sulfide, so that the hydrogen-containing gas stream remained contaminated with such acid gases. Conversely, the absorption medium could be selected for high selectivity of the acid gases in a refinery hydrogen-containing gas stream, in which case the light hydrocarbons, such as methane, were relatively unabsorbed; thereby rendering the effluent hydrogen gas stream still contaminated with the light paraffinic hydrocarbons.

Accordingly, it is an object of this invention to provide a method for separating gases.

It is another object of this invention to produce a concentrated hydrogen gas stream using an improved absorption method.

It is still another object of this invention to produce high purity hydrogen from gaseous fractions containing hydrogen and other low molecular weight gases.

A further object of this invention is to produce high purity hydrogen for use as the recycle stream for a hydrocracking process in a more facile and economical manner than has heretofore been possible.

A broad embodiment of the present invention relates to a method for concentrating hydrogen which comprises contacting a gaseous charge mixture containing hydrogen with a hydrocarbon absorption medium composition comprising a major proportion of polyglycolether and minor proportions of an organic amine and a hydrocarbon at least partially soluble in said ether, in an absorption zone under conditions including a temperature in the range of 50° F. to 300° F. and a relatively high pressure in the range of 100 to 3000 p.s.i.g., to effect absorption of the non-hydrogen gaseous components in said mixture; withdrawing from the absorption zone a hydrogen-rich stream and a hydrocarbon-rich absorption medium; passing the hydrocarbon-rich absorption medium into relatively medium pressure separator means; removing from said separator means a first gaseous stream comprising non-hydrogen components including light hydrocarbons and a liquid stream comprising the absorption medium having reduced hydrocarbon content; recycling a portion of the absorption medium from the separator means to the absorption zone; passing the remainder of the absorption medium from the separator means to a stripping zone at relatively low pressure; and, removing from the stripping zone a second gaseous stream comprising heavy hydrocarbons and a liquid stream comprising the absorption medium suitable for reuse in the absorption zone.

Another embodiment of the invention includes the recycling of the absorption medium from the stripping zone to the absorption zone.

A particular embodiment of the present invention relates to a method for purifying contaminated hydrogen gas which comprises contacting a gaseous charge mixture containing from 30% to 95% by weight hydrogen; the remainder containing paraffinic hydrocarbons as a contaminant therein, with a liquid absorbent composition comprising by volume 50% to 90% polyalkylpolyethyleneglycolether, 0% to 45% alkylamine containing from 6 to 18 carbon atoms per molecule, and 5% to 50% hydrocarbon at least partially soluble in said ether, in an absorption zone at relatively high pressure to effect absorption of at least a significant proportion, preferably, a major proportion, of the non-hydrogen contaminants in said mixture; withdrawing from the absorption zone a purified hydrogen stream and the liquid absorbent having said absorbed contaminants contained therein; passing the withdrawn absorbent into separator means at a relatively medium pressure to effect vaporization of at least a portion of the paraffinic hydrocarbon contaminant; removing from the separator means a first gaseous stream containing normally gaseous light hydrocarbon contaminant and a liquid stream comprising the absorbent having reduced contaminant content; recycling a portion of the absorbent from the separator means to the absorption zone; passing the remainder of the absorbent from the separator means to a stripping zone at relatively low pressure; and, removing from the stripping zone a second gaseous stream containing at least part of the heavy paraffinic hydrocarbon contaminant and a bottoms liquid stream comprising said absorbent suitable for reuse in the absorption zone.

The polyglycolether compound which acts as one component of the absorption medium and/or as the carrying agent for the desired organic amine, if any, is preferably selected to provide a composition which is liquid in all stages of the present process. The preferred glycolether compound also is a relatively non-viscous material having a relatively high boiling point so that it will remain at substantially liquid phase at the temperatures and pressures utilized in the present process. The preferred glycolether is also further selected to provide a liquid medium which is highly miscible with the organic amine, if any, and with the hydrocarbon components present in the contaminated gas which is used as charge stock to the process.

As will be more fully discussed hereinbelow, such preferred ether must also be at least partially miscible with the hydrocarbon portion of the absorption medium composition.

Thus, one of the most useful and readily available classes of glycolether compounds for use in the present process are members of the polyalkylpolyethyleneglycol family, generally containing from 2 to 6 ethylene units per molecule. Examples of this class of suitable ethers include dimethoxytetraethylene glycol, diethoxytriethylene glycol, dibutoxytriethylene glycol, dibutoxydiethylene glycol, dipropoxytetraethylene glycol, dipropoxytriethylene glycol, dipropoxydiethylene glycol, and appropriate mixtures thereof. Such ethers boil generally in the range of from 200° C. to 300° C. The preferred solvent is a mixture comprising dimethoxytriethylene glycol and dimethoxytetraethylene glycol in approximately molar proportions by weight, since this mixture has outstanding selectivity for hydrocarbon contaminants contained in effluent hydrogen gas streams from a hydrocracking process. The ether compound is utilized in its substantially anhydrous condition so that any water present in the feed gas mixture is also removed by the processing scheme embodied in the present process.

Depending upon the extent to which acid gases are present in the feed gas mixture, and the degree to which these gases are to be removed, it may be desirable to include as a component of the absorption medium an organic amine. Generally, the organic amine is selected from the class of compounds characterized as organic bases containing one or more amino groups attached to a hydrocarbon group. The preferred organic amines for use in the present process are compounds having a relatively low pressure so that substantial vaporization of the amine does not occur under the conditions of temperature and pressure used during the absorption medium regeneration step. Suitable organic amines for this purpose may be selected from the aliphatic, aromatic, naphthenic or hetrocyclic amines, as well as from the alkenol amines containing one or more amino and/or hydroxyl groups pre molecule. The amine may also be a primary, secondary, or tertiary amine, the po.yamines, and alkenolamines; with the secondary amines being particularly useful in the present absorbent composition. Typical secondary amines utilizable in the present process include such compounds as dipropylamine, diisopropylamine, isopropyl-n-propylamine, n-butylmethylamine, n-butylisopropylamine, sec-butylmethylamine, sec-butyl-t-butylamine, diisobutylamine, di-n-hexylamine, dicyclohexylamine, dioctylamine, dinonylamine, N-methylani ine, piperidine, morpholine, homologues, analogues and mixtures thereof. It is distinctly preferred to use diisopropylamine as the organic amine compound.

The required hydrocarbon constituent of the present absorbent composition is desirably selected from a class of hydrocarbons which is at least partially soluble in the class of glycolethers selected for use in the present process. The general class of hydrocarbons suitable for use herein include aromatic hydrocarbons, such as benzene, toluene, etc., olefinic hydrocarbons, such as hexene, heptene, cyclohexene and the like, and naphthenic hydrocarbons including paraffinic hydrocarbons, such as methylcyclopentane, cyclohexane, isooctane, and the like. It is distinctly preferable that the hydrocarbon be selected from the group of naphthenic hydrocarbons within the above group. Excellent results are obtained by using the relatively high molecular weight of the paraffinic hydrocarbons, such as the octanes, e.g. isooctane, and nonanes. It is to be understood, however, that the hydrocarbon constituents of the preferred absorbent composition can be any paraffinic-containing hydrocarbon stream which can be characterized by the substantial absence of both aromatic hydrocarbons and olefinic hydrocarbons. It follows, therefore, that the preferred paraffinic hydrocarbon-containing stream, which is an integral part of the absorbent composition, can be formulated in situ by operating the present invention as herein described to tailor the absorbent composition such that it contains significant quantities of paraffinic hydrocarbons which were originally present in the hydrogen-containing feed gas stream to be treated.

The hydrocarbon component of the absorbent composition is preferably present in an amount corresponding to from 5% to 50% by weight of the resulting lean absorbent composition. It is to be noted that the hydrocarbon component of the composition may be added to the process of the present invention or may be obtained at least in part from the hydrocarbons present in the feed gas mixture which is to be purified. As more fully discussed hereinbelow, the proper choice of operating conditions can optimize the flexibility of control over the hydrocarbon component of the absorbent medium.

The glycolether constituent of the present absorbent composition is preferably present in an amount corresponding to from 50% to 90% by weight of the resulting lean absorbent composition. Similarly the amount of organic amine present, if any, ranges in an amount corresponding to from 0% to 45% by weight of the resulting lean absorbent composition. Those skilled in the art will know from the teachings contained herein how to alter the composition of the absorbent so that optimum results may be obtained. For most commercial uses, a typical solvent composition would include 50% preferred ether mixture, 40% diisopropylamine and 10% isooctane.

The invention is more specifically illustrated in the accompanying drawing which is a diagrammatic flow sheet illustrating the preferred arrangement of apparatus for conducting the present process.

Referring to the drawing, charge gas comprising by volume hydrogen 56%, methane 25%, ethane 9%, propane 3½%, butanes and heavier 2.1%, hydrogen sulfide 3.6%, carbon dioxide 0.6%, and nitrogen 0.2%, is fed through line 1 and valve 2 into the lower portion of absorber 3 and passed upward therethrough counter-currently to a suitable absorption medium, such as the typical preferred composition referred to hereinabove, which is introduced into the upper portion of the absorber by means of line 4 utilizing control valve 5, or by means of line 29 via line 4 from regenerator 13 as disclosed hereinafter. Operating conditions within absorber 3 include a relatively high pressure of from 100 to 3000 p.s.i.g., preferably 1000 to 2000 p.s.i.g., and a temperature in the range of 50° F. to 300 °F., preferably approximately 100° F., to effect absorption of at least a major proportion of the non-hydrogen contaminants in the feed mixture including the paraffinic hydrocarbons as contaminants. From the top of absorber 3 a concentrated hydrogen stream is removed via line 6 and valve 7. Typically, the hydrogen content of this stream will exceed 98% by volume, with the remainder being primarily methane.

The hydrocarbon-rich absorbent is removed from absorber 3 through line 8 and valve 9 into flash drum 10 at a relatively medium pressure. Preferably, the pressure in flash drum 10 is from 25 to 200 p.s.i.g and is, in any event, at least 50 p.s.i.g. less than the relatively high pressure used in absorber 3. It was discovered that by using flash drum 10, a controlled amount of the relatively light hydrocarbons, such as methane and ethane, plus a significant proportion of any acid gases contained in the absorption medium, could be removed from the medium thereby partially regenerating the absorbent for re-use in absorber 3. Therefore, light hydrocarbons comprising most of the methane and ethane removed from the feed gas are withdrawn from flash drum 10 via line 31. The absorbent in liquid form and having reduced contaminant content is withdrawn from flash drum 10 through line 11 and a portion thereof is recycled directly to absorber 3 via line 33. It was discovered that this partially regenerated absorbent could successfully be re-used in absorber 3 as part of the absorbing medium. Of course, the amount in which such partially regenerated absorbent could be used depends entirely upon the degree of hydrogen purification desired. Consequently, a larger proportion of partially regenerated absorbent may be used in those cases where extremely pure hydrogen is neither desired nor required. Conversely, in high purity hydrogen substances the amount of partially regenerated absorbent which is recycled is varied in direct relationship to the composition of the lean absorbent recycled in line 29 as will be more fully discussed hereinafter. As will become evident, flexibility of control on the absorbent composition can be obtained by variably adjusting the amount of partially regenerated absorbent recycle with the severity of operation in regenerator 13.

The remaining portion of partially regenerated absorbent is passed through line 12 into regenerator 13 at relatively low pressure. Preferably, regenerator 13 is substantially at atmospheric pressure, although sub-atmospheric and slightly super-atmospheric pressures can be used if desired. As the liquid composition enters regenerator 13, flash vaporization of the remaining volatile contaminants in the absorbent composition, including relatively heavy hydrocarbon contaminants originally present in the feed mixture, and any water absorbed from the feed gas, occurs. Simultaneously, the organic amine salt of the acidic gas component of the feed gas undergoes decomposition to free the acidic gas and the amine. However, it is to be noted that only a portion of the acid gases present in the feed mixture were chemically removed by the amine. The other portion had been removed by physical absorption of these acid gases into the glycolether component of the absorbent composition. Therefore, significantly less heat is required in regenerator column 13 to effectively regenerate the absorbent. Since the flash vaporization due to the relatively low pressure in regenerator 13 accomplishes the removal of the remaining hydrocarbon contaminants, only enough heat is needed in the regenerator to decompose the amine salt and to provide vapors for stripping. Regeneration of the spent absorbent composition may also be promoted by introducing an inert gas or vapor, such as air, nitrogen, flue gas or other inert vapor, such as gaseous hydrocarbon, in the lower portion of regenerator 13 through line 15 in an amount controlled by valve 16.

The mixed vapors of insert gases (if any), relatively heavy hydrocarbons, such as the propanes, butanes, and heavier hydrocarbons originally present in the feed, water vapor and any acid gas compounds, as well as a small amount of the ether compound and the organic amine component, vaporized by virtue of the partial pressure of these ingredients at the regeneration temperature and pressure, is removed from regenerator 13 through line 17 and the resulting mixed vapors are cooled in condenser 18 wherein the condensable components are liquified. The effluent from condenser 18 is withdrawn through line 19 and valve 20 into receiver vessel 21 for separation into gaseous and liquid phases. A condensed aqueous phase accumulates as a lower liquid layer in receiver 21 and may be withdrawn therefrom through line 22 and valve 23 for discharge from the process. The relatively non-condensable gases at the temperature and pressure maintained in condenser 18, including the relatively heavy hydrocarbon contaminants present in the feed mixture, are withdrawn from the process through line 24 and valve 25. The flexibility in control of the absorbent composition, primarily through control of its hydrocarbon content, is achieved in part by withdrawing a condensed portion of the overhead vapors from receiver 21 through standpipe 26 through line 27 and valve 28 for discharge into line 29 through which the liquid bottoms from regenerator 13 are withdrawn at a rate determined by valve 30. Alternatively, some of the hydrocarbon withdrawn through line 24 or through line 27, or both, may be introduced into line 15 (by means not shown) to supply additional scrubbing vapors. If desired, a net condensables product can be withdrawn from the system by known means (not shown).

In order to assist in the further decomposition of the organic amine salts present, if any, and the vaporization of the water and desired hydrocarbon constituents in the absorbent composition, additional heat may be supplied through reboiler 14 to the lower portion of regenerator 13. Generally, the temperatures maintained in regenerator 13 at atmospheric pressure will be from 100° F. to 500° F.; preferably with significant quantities of the organic amine salts to be decomposed, the temperature in the bottom of regenerator 13 will be in the range of from 225° F. to 260° F.

In all cases, the practice of this invention, according to the above description, will produce an absorbent composition in line 29 which is suitable for re-use in the process for counter-current contact with the contaminated feed gas in absorber 3. Therefore, the bottom product from regenerator 13 is preferably recycled to absorber 3 via line 29. Fresh absorbent composition, or any components thereof, as needed, is added to the process through line 4 and valve 5.

It is noted from this illustrative description of the present invention that flexibility of control over the absorbent composition is achieved through the proper removal of the hydrocarbon contaminants via lines 31 and 24 respectively. Cooperating in this control is the flexibility of recycling partially regenerated absorbent through line 33, and by controlling the amount of overhead hydrocarbon makeup rate through line 27 to line 29. The amount of hydrocarbon available for such makeup can be controlled by adjusting the vaporization rate through either control in reboiler 14 or inert gas introduction rate through line 15. All of these factors cooperate to produce a unified process having substantial economy of operation over the prior art processes.

Advantages to the present process over the prior art schemes include the practical possibilities of reducing operating pressures on the system by, for example, at least 150 p.s.i.g. on the hydrocracking process, reducing the amount of absorbent circulation rate in the absorber by, for example, as much as 75%, by reducing significantly the size and heat demand of the heating equipment for the regeneration step, and by significantly reducing hydrogen losses by solution since considerably less volume of liquid is circulated in the absorption zone. Other economies of operation and simplified steps in the operation will be evident to those skilled in the art.

As used herein, the term "non-hydrogen gaseous components" is intended to include all light gases, such as the light paraffinic hydrocarbons, the acid gases and the inerts, but excludes any significant amounts of hydrogen. Also as used herein, the gaseous mixture used as charge stock preferably comprises a mixture of hydrogen and methane, however, it is to be understood that the gaseous charge mixture can comprise any gaseous mixture and low molecular weight gases. In any event, the gaseous charge mixture should predominate in hydrogen, in that it should contain more than 30% on a weight basis, and preferably should contain 65% to 95% by weight hydrogen.

The invention claimed:
1. Method for concentrating hydrogen which comprises contacting a gaseous charge mixture containing hydrogen, hydrocarbons, and acid gases with a hydrocarbon absorption medium composition comprising a major proportion of polyglycol ether, and minor proportions of an organic amine and a hydrocarbon at least partially soluble in said ether; in an absorption zone under conditions including a temperature in the range of 50° F. to 300° F. and a relatively high pressure in the range of 100 to 3000 p.s.i.g., to effect absorption of said non-hydrogen gaseous components in said mixture, withdrawing from the absorption zone a hydrogen-rich stream and a hydrocarbon-rich absorption medium containing acid gases, passing the hydrocarbon-rich absorption medium into relatively medium pressure separator means, removing from said separator means a first gaseous stream comprising non-hydrogen components including light hydrocarbons, and a liquid stream comprising the absorption medium having reduced hydrocarbon content, recycling a portion of the absorption medium from said separator means to the absorpttion zone, passing the remainder of the absorption medium from said separator means to a stripping zone at relatively low pressure, removing from the stripping zone a second gaseous stream comprising heavy hydrocarbons and a liquid stream comprising the absorption medium suitable for reuse in the absorption zone.

2. Method according to claim 1 wherein absorption medium removed from the stripping zone is recycled to the absorption zone.

3. Method according to claim 1 wherein said polyglycol ether is a mixture of polyalkylpolyethylene glycol ethers containing from 2 to 6 ethylene units per molecule.

4. Method according to claim 3 wherein said mixture contains from 3 to 4 ethylene units per molecule.

5. Method according to claim 1 wherein said organic amine is an alkyl amine containing from 6 to 18 carbon atoms per molecule.

6. Method according to claim 1 wherein said medium pressure is in the range of 25 to 200 p.s.i.g., which pressure is at least 50 p.s.i.g. less than said relatively high pressure.

7. Method according to claim 6 wherein said relatively low pressure is substantially atmospheric pressure.

8. Method for purifying contaminated hydrogen gas which comprises contacting a gaseous charge mixture containing by weight from 30% to 95% hydrogen, the non-hydrogen contaminants comprising paraffinic hydrocarbons and acid gases, with a liquid absorbent composition comprising by volume 50% to 90% polyalkylpolyethyleneglycol ether, 0% to 45% alkylamine containing from 6 to 18 carbon atoms per molecule, and 5% to 50% hydrocarbon at least partially soluble in said ether, in an absorption zone at relatively high pressure to effect absorption of at least a major proportion of said non-hydrogen contaminants in said mixture, withdrawing from the absorption zone a purified hydrogen stream and the liquid absorbent having said absorbed contaminants contained therein, passing the withdrawn absorbent into separator means at a relatively medium pressure to effect vaporization of at least a portion of the paraffinic hydrocarbon contaminant, removing from the separator means a first gaseous stream containing normally gaseous light paraffinic hydrocarbon contaminant and a liquid stream comprising the absorbent having reduced contaminant content, recycling a portion of the absorbent from the separator means to the absorption zone, passing the remainder of the absorbent from the separator means to a stripping zone at relatively low pressure, removing from the stripping zone a second gaseous stream containing at least part of the heavy paraffinic hydrocarbon contaminant and a bottoms liquid stream comprising said absorbent suitable for reuse in the absorption zone.

9. Method according to claim 8 wherein said bottom stream is recycled to said absorption zone.

10. Method according to claim 8 wherein said relatively high pressure is from 100 to 3000 p.s.i.g., said relatively medium pressure is from 25 to 200 p.s.i.g. which pressure being at least 50 p.s.i.g. less than said relatively high pressure, and said relatively low pressure is substantially atmospheric pressure.

11. Method according to claim 10 wherein said ether comprises dimethoxytetraethyleneglycol, said amine is diisopropylamine, and said hydrocarbon at least partially soluble in said ether comprises a paraffin-containing hydrocarbon mixture.

12. Method according to claim 8 wherein said hydrocarbon component of said absorbent composition comprises a paraffin-containing hydrocarbon stream.

References Cited

UNITED STATES PATENTS

| | | | |
|---|---|---|---|
| 2,781,863 | 2/1957 | Bloch et al. | 55—73 X |
| 3,102,012 | 8/1963 | Dowd | 55—48 X |
| 3,213,154 | 10/1965 | Bauer | 55—51 X |
| 3,255,572 | 6/1966 | Miller et al. | 55—44 X |

REUBEN FRIEDMAN, *Primary Examiner.*

R. W. BURKS, *Assistant Examiner.*